United States Patent
Joram et al.

(10) Patent No.: US 9,892,261 B2
(45) Date of Patent: Feb. 13, 2018

(54) COMPUTER IMPOSED COUNTERMEASURES DRIVEN BY MALWARE LINEAGE

(71) Applicant: FireEye, Inc., Milpitas, CA (US)

(72) Inventors: Sharwan Kumar Joram, Kharadi (IN); Shyam Prakash Jha, Aundh (IN); William Matthew Hartley, Broadlands, VA (US); Madhav Sonthalia, Frisco, TX (US)

(73) Assignee: FireEye, Inc., Milpitas, CA (US)

( * ) Notice: Subject to any disclaimer, the term of this patent is extended or adjusted under 35 U.S.C. 154(b) by 92 days.

(21) Appl. No.: 14/698,534

(22) Filed: Apr. 28, 2015

(65) Prior Publication Data

US 2016/0323295 A1 Nov. 3, 2016

(51) Int. Cl.
H04L 29/06 (2006.01)
G06F 21/57 (2013.01)
G06F 21/56 (2013.01)

(52) U.S. Cl.
CPC .......... *G06F 21/577* (2013.01); *G06F 21/566* (2013.01); *H04L 63/145* (2013.01)

(58) Field of Classification Search
CPC ..... G06F 21/577; G06F 21/566; H04L 63/145
USPC .......................................................... 726/23
See application file for complete search history.

(56) References Cited

U.S. PATENT DOCUMENTS

| 6,947,978 | B2 | 9/2005 | Huffman et al. |
| 7,234,168 | B2 | 6/2007 | Gupta et al. |
| 7,293,287 | B2 | 11/2007 | Fischman et al. |
| 7,308,715 | B2 | 12/2007 | Gupta et al. |
| 7,409,714 | B2 | 8/2008 | Gupta et al. |
| 7,457,823 | B2 | 11/2008 | Shraim et al. |

(Continued)

FOREIGN PATENT DOCUMENTS

| EP | 2498198 B1 | 5/2017 |
| GB | 2439806 A | 9/2008 |

(Continued)

OTHER PUBLICATIONS

Office Action dated May 3, 2012, U.S. Appl. No. 12/132,327, filed Jun. 3, 2008.

(Continued)

*Primary Examiner* — Kambiz Zand
*Assistant Examiner* — Aubrey Wyszynski

(57) ABSTRACT

A system to identify and counter computer malware. The system comprises a processor, a memory, a data store comprising information about known computer malware, wherein the information about known computer malware is partitioned into a plurality of malware families, and comprising a plurality of mappings, wherein each mapping associates one malware family with at least one countermeasure for mitigating a risk to an information technology asset posed by the known computer malware associated with the malware family, and an application stored in the memory. The application analyzes a software artifact, determines characteristics of the software artifact, and determines a plurality of metrics, each metric representing a degree of match between the software artifact and one of the plurality of malware families. Based on the plurality of metrics, the application further determines a malware family that best matches the software artifact.

34 Claims, 4 Drawing Sheets

(56) References Cited

U.S. PATENT DOCUMENTS

| | | |
|---|---|---|
| 7,552,480 B1 | 6/2009 | Voss |
| 7,624,444 B2 | 11/2009 | Gupta et al. |
| 7,958,027 B2 | 6/2011 | Lawrence |
| 8,010,469 B2 | 8/2011 | Kapoor et al. |
| 8,091,065 B2 | 1/2012 | Mir et al. |
| 8,132,260 B1 | 3/2012 | Mayer et al. |
| 8,135,657 B2 | 3/2012 | Kapoor et al. |
| 8,250,651 B2 | 8/2012 | Huang et al. |
| 8,272,053 B2 | 9/2012 | Markham et al. |
| 8,375,450 B1* | 2/2013 | Oliver .................. G06F 21/56 713/181 |
| 8,438,644 B2 | 5/2013 | Watters et al. |
| 8,494,974 B2 | 7/2013 | Watters et al. |
| 8,566,476 B2 | 10/2013 | Shiffer et al. |
| 8,713,681 B2 | 4/2014 | Silberman et al. |
| 8,793,278 B2 | 7/2014 | Frazier et al. |
| 8,813,050 B2 | 8/2014 | Watters et al. |
| 8,881,271 B2 | 11/2014 | Butler, II |
| 8,949,257 B2 | 2/2015 | Shiffer et al. |
| 9,015,846 B2 | 4/2015 | Watters et al. |
| 9,268,936 B2 | 2/2016 | Butler |
| 9,275,229 B2 | 3/2016 | LeMasters |
| 9,413,781 B2 | 8/2016 | Cunningham et al. |
| 9,459,901 B2 | 10/2016 | Jung et al. |
| 9,497,213 B2 | 11/2016 | Thompson et al. |
| 9,633,134 B2 | 4/2017 | Ross |
| 9,654,485 B1 | 5/2017 | Neumann |
| 9,690,935 B2 | 6/2017 | Shiffer et al. |
| 9,749,343 B2 | 8/2017 | Watters et al. |
| 9,749,344 B2 | 8/2017 | Watters et al. |
| 2003/0009699 A1 | 1/2003 | Gupta et al. |
| 2003/0051026 A1 | 3/2003 | Carter et al. |
| 2003/0056116 A1 | 3/2003 | Bunker et al. |
| 2003/0097588 A1 | 5/2003 | Fischman et al. |
| 2003/0177376 A1 | 9/2003 | Arce Velleggia et al. |
| 2003/0233319 A1 | 12/2003 | Lawrence |
| 2005/0149348 A1 | 7/2005 | Baum-Waidner |
| 2005/0210275 A1 | 9/2005 | Homing et al. |
| 2006/0015941 A1 | 1/2006 | McKenna |
| 2006/0031940 A1 | 2/2006 | Rozman et al. |
| 2006/0059557 A1 | 3/2006 | Markham et al. |
| 2006/0080637 A1 | 4/2006 | Treit et al. |
| 2006/0117386 A1 | 6/2006 | Gupta et al. |
| 2006/0191007 A1 | 8/2006 | Thielamay |
| 2006/0212932 A1 | 9/2006 | Patrick et al. |
| 2007/0006315 A1 | 1/2007 | Bushnaq |
| 2007/0100642 A1 | 5/2007 | Paulus et al. |
| 2007/0106981 A1 | 5/2007 | Bird |
| 2007/0113281 A1 | 5/2007 | Leach |
| 2007/0169194 A1 | 7/2007 | Church et al. |
| 2007/0180522 A1 | 8/2007 | Bagnall |
| 2007/0180525 A1 | 8/2007 | Bagnall |
| 2007/0186284 A1 | 8/2007 | McConnell |
| 2007/0192859 A1 | 8/2007 | Shahar et al. |
| 2007/0192867 A1 | 8/2007 | Miliefsky |
| 2007/0240217 A1 | 10/2007 | Tuvell et al. |
| 2007/0240218 A1* | 10/2007 | Tuvell .................. G06F 21/56 726/24 |
| 2007/0250441 A1 | 10/2007 | Paulsen et al. |
| 2007/0251988 A1 | 11/2007 | Ahsan et al. |
| 2007/0255723 A1 | 11/2007 | Jung et al. |
| 2007/0277241 A1* | 11/2007 | Repasi ................ G06F 21/562 726/24 |
| 2008/0028470 A1 | 1/2008 | Remington et al. |
| 2008/0040191 A1 | 2/2008 | Chakravarty et al. |
| 2008/0082380 A1 | 4/2008 | Stephenson |
| 2008/0086718 A1 | 4/2008 | Bostick et al. |
| 2008/0167930 A1 | 7/2008 | Cao et al. |
| 2008/0196104 A1* | 8/2008 | Tuvell .................. H04L 12/585 726/24 |
| 2008/0209517 A1 | 8/2008 | Nightingale et al. |
| 2008/0301051 A1 | 12/2008 | Stahlberg |
| 2009/0099885 A1 | 4/2009 | Sung et al. |
| 2009/0128628 A1 | 5/2009 | Reinitz et al. |
| 2009/0150442 A1 | 6/2009 | Barnard et al. |
| 2009/0178139 A1 | 7/2009 | Stute et al. |
| 2009/0198560 A1 | 8/2009 | Nahum |
| 2009/0198641 A1 | 8/2009 | Tortoriello |
| 2010/0043066 A1 | 2/2010 | Miliefsky |
| 2010/0050260 A1 | 2/2010 | Nakakoji et al. |
| 2010/0235918 A1 | 9/2010 | Mizrahi et al. |
| 2011/0039237 A1 | 2/2011 | Skare |
| 2011/0173699 A1 | 7/2011 | Figlin et al. |
| 2011/0252479 A1 | 10/2011 | Beresnevichiene et al. |
| 2011/0264608 A1 | 10/2011 | Gonsalves et al. |
| 2011/0302291 A1 | 12/2011 | Draugelis |
| 2012/0072983 A1 | 3/2012 | McCusker et al. |
| 2012/0096558 A1 | 4/2012 | Evrard |
| 2012/0180133 A1 | 7/2012 | Al-Harbi et al. |
| 2012/0210265 A1 | 8/2012 | Delia et al. |
| 2013/0018796 A1 | 1/2013 | Kolhatkar et al. |
| 2013/0282426 A1 | 10/2013 | Watters et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0082749 A1 | 3/2014 | Holland et al. |
| 2014/0189687 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0297494 A1 | 10/2014 | Watters et al. |
| 2015/0096023 A1* | 4/2015 | Mesdaq ............... H04L 63/145 726/23 |
| 2016/0044000 A1 | 2/2016 | Cunningham |
| 2016/0241580 A1 | 8/2016 | Watters et al. |
| 2016/0241581 A1 | 8/2016 | Watters et al. |
| 2016/0323295 A1 | 11/2016 | Joram et al. |
| 2017/0048276 A1 | 2/2017 | Bailey et al. |
| 2017/0063920 A1 | 3/2017 | Thomas et al. |
| 2017/0230412 A1 | 8/2017 | Thomas et al. |

FOREIGN PATENT DOCUMENTS

| | | |
|---|---|---|
| WO | WO2007117636 A2 | 10/2007 |
| WO | WO2009047113 A1 | 4/2009 |
| WO | WO2009083036 A1 | 7/2009 |
| WO | WO2009148724 A1 | 12/2009 |
| WO | WO2012075336 A1 | 6/2012 |
| WO | WO2015051181 A1 | 4/2015 |
| WO | WO2016209993 A1 | 12/2016 |

OTHER PUBLICATIONS

Final Office Action dated Aug. 8, 2012, U.S. Appl. No. 12/132,327, filed Jun. 3, 2008.

Office Action dated Jan. 23, 2014, U.S. Appl. No. 12/132,327, filed Jun. 3, 2008.

Notice of Allowance dated May 13, 2014, U.S. Appl. No. 12/132,327, filed Jun. 3, 2008.

Office Action dated Apr. 5, 2017, U.S. Appl. No. 14/308,686, filed Jun. 18, 2014.

Office Action dated Aug. 8, 2012, U.S. Appl. No. 13/042,066, filed Mar. 7, 2011.

Notice of Allowance dated Jan. 10, 2013, U.S. Appl. No. 13/042,066, filed Mar. 7, 2011.

Foreign Communication From a Related Counterpart Application—European Office Action dated Nov. 27, 2013, European Application No. 12158396.7, Apr. 6, 2012, 5 pages.

Foreign Communication From a Related Counterpart Application—European Notice of Intention to Grant dated Nov. 7, 2016, European Application No. 12158396.7, Apr. 6, 2012, 5 pages.

Foreign Communication From a Related Counterpart Application—European Decision to Grant dated Apr. 13, 2017, European Application No. 12158396.7, Apr. 6, 2012, 5 pages.

Pre-Interview Communication dated Dec. 15, 2014, U.S. Appl. No. 13/862,373, filed Apr. 12, 2013.

Notice of Allowance dated Feb. 20, 2015, U.S. Appl. No. 13/862,373, filed Apr. 12, 2013.

(56) References Cited

OTHER PUBLICATIONS

Office Action dated Jul. 3, 2012, U.S. Appl. No. 12/689,160, filed Jan. 18, 2010.
Notice of Allowance dated Dec. 24, 2012, U.S. Appl. No. 12/689,160, filed Jan. 18, 2010.
Pre-Interview Communication dated Nov. 2, 2016, U.S. Appl. No. 13/850,296, filed Mar. 26, 2013.
FAIPP Office Action dated Mar. 10, 2017, U.S. Appl. No. 13/850,296, filed Mar. 26, 2013.
Pre-Interview Communication dated Sep. 29, 2016, U.S. Appl. No. 14/244,884, filed Apr. 3, 2014.
FAIPP Office Action dated Mar. 6, 2017, U.S. Appl. No. 14/244,884, filed Apr. 3, 2014.
Notice of Allowance dated Apr. 26, 2017, U.S. Appl. No. 14/244,884, filed Apr. 3, 2014.
Office Action dated Sep. 22, 2016, U.S. Appl. No. 14/244,886, filed Apr. 3, 2014.
Final Office Action dated Feb. 9, 2017, U.S. Appl. No. 14/244,886, filed Apr. 3, 2014.
Advisory Action dated Apr. 10, 2017, U.S. Appl. No. 14/244,886, filed Apr. 3, 2014.
Foreign Communication From a Related Counterpart Application—International Search Report and Written Opinion, PCT/US2009/042006, dated Jun. 19, 2009, 11 pages.
Foreign Communication From a Related Counterpart Application—International Preliminary Report on Patentability, PCT/US2009/042006, dated Dec. 6, 2012, 8 pages.
Foreign Communication From a Related Counterpart Application—European Search Report, European Application No. 12158396.7, dated Apr. 6, 2012, 6 pages.
Stewart, Joe, "Truman—The Reusable Unknown Malware Analysis Net," SecureWorks, Version 2, Jun. 1991, 1 page.
Wikipedia, "Bayesian Inference," http://en.wikipedia.org/w/index.php?title=Bayesian_inference&printable=yes, May 15, 2008, 12 pages.
Wikipedia, "Botnet," http://en.wikipedia.org/w/index.php?title=Botnet&printable=yes, May 11, 2008, 6 pages.
FireEye, Inc., "FireEye Malware Analysis & Exchange Network, Malware Protection System," 2010, two pages, FireEye, Inc., Milpitas, CA.
FireEye, Inc., "FireEye Malware Analysis, Modem Malware Forensics," 2010, two pages, FireEye, Inc., Milpitas, CA.
Yin, Heng, et al., "Panorama: Capturing System-wide Information Flow for Malware Detection and Analysis," ACM Conference on Computer and Communications Security Oct. 29, 2007, 12 pgs., Alexandria, VA.
Idika, Nwokedi, et al., "A Survey of Malware Detection Techniques," Feb. 2, 2007, 48 pgs., Department of Computer Science, Purdue University, West Lafayette, IN.
Notice of Allowance dated May 24, 2017, U.S. Appl. No. 14/244,886, filed Apr. 3, 2014.
International Search Report and Written Opinion dated Mar. 2, 2015, International Application No. PCT/US2014/058909, International filing date Oct. 2, 2014.
International Preliminary Report on Patentability dated Apr. 5, 2016, International Application No. PCT/US2014/058909, International filing date Oct. 2, 2014.
European Search Report dated Apr. 28, 2017, EPC Application No. 14850557.1, International filing date Oct. 2, 2014.
International Search Report and Written Opinion dated , 2016, International Application No. PCT/US2016/038809, International filing date Jun. 22, 2016.
Notice of Allowance dated Oct. 11, 2017, U.S. Appl. No. 14/308,686, filed Jun. 18, 2014.
Final Office Action dated Aug. 10, 2017, U.S. Appl. No. 13/850,296, filed Mar. 26, 2013.

\* cited by examiner

COMPUTER IMPOSED COUNTERMEASURES DRIVEN BY MALWARE LINEAGE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The growing dependence on information technology in business, industry, and private lives is well known. Our computers are commonly linked by networks and are to some extent interdependent. This linkage may expose information and private networks to a variety of attacks which may be referred to generally as cyberattacks or cybercrimes. The attacks may be denial of service (DOS) attacks that bomb a public internet site with a very high volume of content requests that starves out other legitimate content requests. The attack may be an identity theft attack that steals financial information and uses it to perpetrate a financial fraud, such as an unauthorized credit card transaction. The attack may access private information and use that private information to thwart a business project. The attack may access private correspondence and release that correspondence to embarrass a corporation.

To launch these cyberattacks, cybercriminals often employ software tools that may be referred to as malware. The malware can take a large variety of forms. Sometimes malware is shared among disparate cybercriminals to perpetrate different cybercrimes. A malware may go through a variety of different transformations over a period of time. The author of the malware may refine it and add functionality to the malware. Others may take the malware produced by an author and extend it or couple it with separate malware.

A variety of countermeasures have been developed to thwart or reduce the effectiveness of malware. As a new malware item is observed, new countermeasures are developed to parry the threat. Countermeasures may take the form of software and/or systems or platforms within an information technology system. For example, a firewall may be a platform that mediates between the unsecured internet and a corporate secure network. Other countermeasures, such as virus detection software, may execute periodically on computer systems.

SUMMARY

In an embodiment, a system to identify and counter computer malware is disclosed. The system comprises a processor, a memory, a first data store comprising information about known computer malware, a second data store comprising cybercrime historical information, and an application stored in the memory. The information about known computer malware in the first data store is partitioned into a plurality of malware families, and comprising a plurality of mappings, wherein each mapping associates one malware family with at least one countermeasure for mitigating a risk to an information technology asset posed by the known computer malware associated with the malware family. When executed by the processor, the application analyzes a software artifact identified to be present in an information technology asset, based on the analysis of the software artifact determines a plurality of characteristics of the software artifact, and determines a plurality of metrics, each metric representing a degree of match between the software artifact and one of the plurality of malware families based on the characteristics of the software artifact and on the characteristics of each of the plurality of malware families stored in the first data store. The application further analyzes cybercrime historical information accessed from the second data store. Based on the plurality of metrics and based on the analysis of cybercrime historical information, the application further determines a malware family that best matches the software artifact, responsive to the metric associated with the best match malware family exceeding a pre-defined threshold, determines the software artifact to be computer malware, responsive to determining the software artifact to be computer malware, identifies at least one countermeasure based on the mapping for the best match malware family, and causes the at least one countermeasure to be activated on the information technology asset.

In another embodiment, a method of mitigating vulnerability of an information technology asset to a computer malware is disclosed. The method comprises determining a value of each of a plurality of characteristics of a software artifact by a computer system, comparing the characteristics of the software artifact to the characteristics of a plurality of families of known computer malware by the computer system, and associating the software artifact by the computer system to one of the plurality of families of known computer malware by the computer system based on comparing the software artifact to the families of known computer malware. The method further comprises selecting a countermeasure by the computer system from among a plurality of countermeasures based on the family of known computer malware that the software artifact is associated to and based on at least one of the characteristics of the software artifact and commanding the selected countermeasure to execute on the information technology asset.

In yet another embodiment, a method of mitigating risk of a cyberattack on an information technology asset. The method comprises determining by a computer system a value of a plurality of characteristics of a malware software item, where the characteristics comprise at least two of a file path identified in the malware software item, a file name identified in the malware software item, a name of an author of the malware software item, an identity of a compiler used to compile the malware software item, a domain name identified in the malware software item, an internet protocol address identified in the malware software item, an email address identified in the software item, and an identity of a programming language used to create the malware software item. The method further comprises determining by the computer system a plurality of hashes of the malware software item, wherein each of the hashes corresponds to separate blocks of the malware software item and comparing the malware software item by the computer system to a plurality of malware families, wherein each of the characteristics of the malware software item is compared to a corresponding characteristic of each of the malware families and each of the hashes of the malware software item is compared to a corresponding hash associated with the malware families. The method further comprises, based on comparing the malware software item to the malware families, associating the malware software item to one of the malware families and based on the malware family to which the malware software item is associated, taking action to mitigate vulnerability of the information technology asset to the malware software item.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
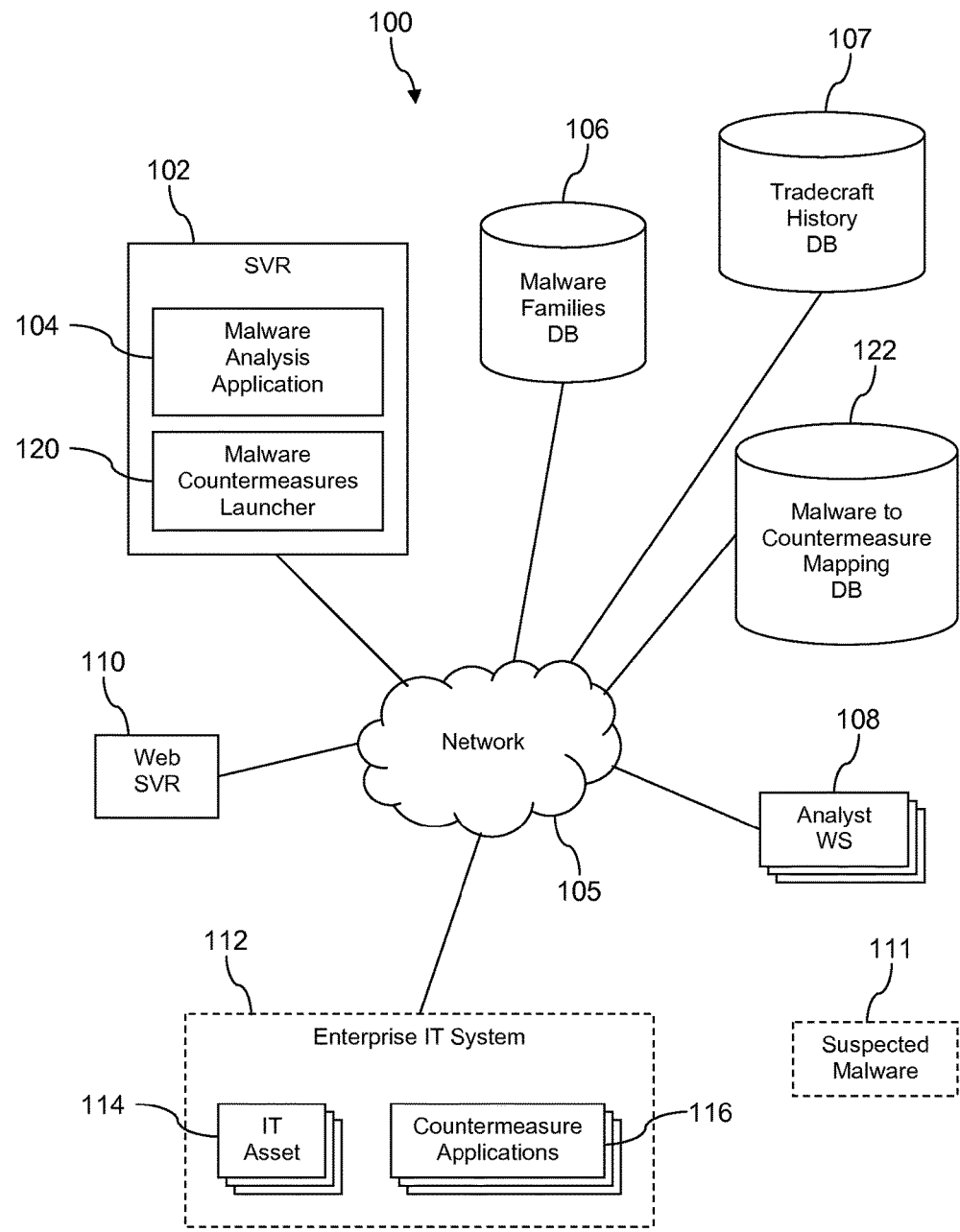
FIG. 1 is a block diagram of an information technology system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Cyberattacks have long been a concern to corporations and individuals. High profile cyberattacks of recent memory remind us that cyber threats are real and can cause great damage—both financial damage and damage to business and personal relationships. It seems that recent attacks may be even more damaging and costly than attacks before 2010. Information technologists responsible for protecting information technology assets are highly challenged by the creativity of cyberattacks and cybercriminals. The task of keeping ahead of new attacks and remaining vigilant threatens to exceed the capacities of the limited number of skilled information technology security personnel available.

When suspected malware is identified, information technology security personnel customarily have performed a manual preliminary analysis of the suspected malware. Malware is software that poses a threat to the security of a computer system or information technology asset. Suspected malware may also be referred to as a software artifact in some contexts herein. This preliminary analysis is directed, at least in part, to determining what type of software the suspected malware is, where the suspected malware comes from, who its author may have been, what other malware it may be related to, what specific information technology vulnerabilities the suspected malware may be directed to, and the like. The preliminary analysis may further determine or declare whether the suspected malware in fact is or is not malware. This preliminary analysis may be time consuming and divert the analyst from other tasks.

The present disclosure teaches a system and method that automatically performs a preliminary analysis of the suspected malware. This can free the analyst for working on other cyber security issues that may not be amenable to automated processing and/or automated analysis. Additionally, this system and method may promote a more rapid initial response to a new malware, thereby reducing damages that might result from the malware. It is understood that the suspected malware is just that, a software artifact that is "suspected" to be malware. It is unknown, prior to processing by the system and method taught herein, what the suspected malware is and whether it is in fact malware. While the system is contemplated to be able to cope with instances of known malware, it is more specifically directed to analyzing and acting on software artifacts that may be malware but are not previously known or identified malware which can be positively identified as such and then treated with a pre-canned solution or countermeasure. As such, the system is not a virus scanner (e.g., virus scanners search for known, previously identified specific malware).

The system automatically analyzes the suspected malware to determine a variety of characteristics or parameters about the suspected malware. One or more of authorship, source programming language, compiler used, embedded email addresses, and embedded internet protocol (IP) addresses may be determined. A geographic location where the suspected malware was deployed and a language used in the malware may be determined. Whether the malware is multilingual may be determined. Further details of possible characteristics, parameters, and/or attributes of the software artifact or suspected malware that may be determined automatically by the system are described hereinafter. It is understood that some of the information (e.g., values of characteristics, parameters, or attributes) about the software artifact and/or suspected malware may be input by an analyst using the system. For example, the analyst who desires the system to automatically analyze a given software artifact may use a user interface of the system to input known information such as where (what country, what enterprise) the software artifact came from, a computer system on which the software artifact was found, and the like.

The system compares the values of the characteristics, parameters, and/or attributes of the suspected malware to the values of corresponding characteristics of a plurality of known malware families to determine whether the suspected malware belongs to an already known malware family. For example, a sum of weighted factors can be calculated, where the weighting values take into account the relative prioritization among the relative matches of the values of characteristics or parameters of the suspected malware to the values of corresponding characteristics of the malware families.

In an embodiment, rolling hashes of the suspected malware may be determined and compared to corresponding hashes determined for members of the known families of malware. Rolling hashes of the suspected malware may be determined having different windows or lengths. These rolling hashes may be compared with corresponding rolling hashes determined for members of the known families of malware. When a hashing match is found, this may comprise a strong factor in associating a suspected malware to a known family of malware, because it indicates that a portion of the suspect malware is the same as a portion of at least one member of the known malware family, suggesting a common lineage. A plurality of hashing matches between a suspected malware and members of the subject known malware family may increase the certainty of associating the suspected malware to that known malware family. When a suspected malware or software artifact is determined to match a known malware family, the software artifact may be declared or deemed malware (e.g., it is no longer suspected to be malware, it is determined to actually be, within predetermined limits of certainty, malware) and will then be treated as malware.

When a malware item is deemed to match a known family of malware, a countermeasure that has been identified for use with the known family of malware may automatically be selected for use in countering the malware, for example for executing on a computer system that has been attacked by the malware or on which the malware has been detected. In an embodiment, the countermeasure may be executed automatically, without the intervention of the information technology security analyst, which may result in reduced financial losses due to rapid response. A data store may contain a mapping of malware families to countermeasures that should be applied when a new malware (e.g., a previously unknown malware) associated with that malware family is encountered for the first time. An application on the system may access this data store, index into the information using a malware family identity, find a list of one or more countermeasures, and then cause the indexed countermeasures to be executed.

In an embodiment, the countermeasures that may be automatically applied may be a sub-set of available countermeasures. This sub-set of countermeasures may include countermeasures with relatively limited powers or authorizations. The countermeasures in this sub-set may aim at mitigating and/or slowing damages that may be caused by the suspected malware, a kind of stalling action to buy time for an information technology security analyst to manually analyze and identified a preferred countermeasure response. The countermeasures in this sub-set may be restricted to taking actions that are fully reversible. In an embodiment, restricting the selection of countermeasures that may automatically be applied may be prudent in the context of an uncertain, provisional, and/or preliminary diagnosis of suspected malware. As examples, the suspected malware may be confined to a quarantine area in memory rather than being deleted entirely; the suspected malware may be temporarily restricted by the operating system to executing a "safe" sub-set of operating system calls rather than totally shut-down; or the suspected malware may be scheduled for execution by the operating system at a lower frequency, for example at $1/10$ normal frequency, to slow the damage it may do rather than killing the suspected malware.

As an example, it may be undesirable to automatically invoke a countermeasure that shuts down the load balancer that distributes customer on-line purchase transactions to sales completion servers of a giant electronic commerce site on the Monday after Thanksgiving ("Cyber Monday") when a suspected malware is detected in the load balancer server. As an alternative, a different countermeasure that may limit or slow the damage that the suspected malware might cause may be executed on the load balancer, a team of information technology security analysts may be notified of the threat posed by the suspected malware, and the team of information technology security analysts can make a choice of whether a more aggressive countermeasure ought to be applied. This may be likened to delegating some lower priority control functions to electronic systems (e.g., anti-lock braking systems, cruise control systems) while reserving higher priority control functions to human beings (e.g., manual control of the steering wheel).

In another embodiment, the list of one or more countermeasures associated with the malware family identities may further be indexed by other characteristics, parameters, or attributes of malware. A malware countermeasures launcher application may access the mapping of malware families to countermeasures with both an identify of a malware family as well as with values of one or more characteristics of the malware, for example a geographical location where the malware was found or introduced from, a language used for plain text in the malware, a target processor associated with the malware, and the like. In this case, the malware countermeasures launcher application may select and apply countermeasures (e.g., launch or cause countermeasures to be executed) that are specific not only to the malware family but to some of the particulars of the malware.

In another embodiment, results of preliminary analysis of the association of the suspected malware to malware families is further analyzed based on information in a tradecraft history data store. The information in the tradecraft history data store comprises information about known malware attacks, cybercrimes, espionage, hack attacks, hacktivism, and the like, and may provide information about who, when, where, and what. Who or what group initiated the malware attack or cybercrime? When did they launch the attack? Where did the attack occur or whom did the attack target? What did the attack strike? What information technology assets, what application or operating system vulnerabilities were targeted? In an embodiment, tradecraft information stored in the tradecraft history data store may further be derived from other analysis and information collection, for example correlating data to identify a new threat.

This information may be combined to further elaborate the picture provided by the preliminary analysis of the association of the suspected malware to malware families. For example, if the preliminary analysis determined that the suspected malware was substantially similar to three different malware families but the comparisons were too close to call a preference for one family alone, this preliminary result may be used in combination with information from the tradecraft history data store to select one malware family from the preliminary identification of three malware families. For example, possibly the value of one or more of the characteristics or parameters associated with the suspected malware can be associated with high probability to a known cybercrime group, based on the tradecraft history data store; and it is known that the cybercrime group sometimes uses malware associated with one of the three different malware families but never uses malware associated with the other two of the three different malware families. That analysis strongly supports the inference that the suspected malware should be associated with the malware family the cybercrime group is known to use (the one malware family among the three malware families identified in the preliminary result).

In an embodiment, membership in or association of suspected malware to a first malware family may be determined primarily based on a debug string, file metadata information, one or more rolling hash, and the header section of the suspected malware compared to the corresponding characteristics or properties of the first malware family while membership of suspected malware in or association to a second malware family may be determined primarily based on a geographical location, actor name, multilingual makers, and a file name of the suspected malware compared to the corresponding characteristics or properties of the second malware family. Said in other words, the matching criteria may be different from malware family to malware family. In an embodiment, a cyber-analyst or a technician may define the matching criteria to the system for each malware family.

Turning now to FIG. 1, an information technology system 100 is described. In an embodiment, the system 100 comprises a server computer 102 that executes a malware analysis application 104. During this analysis, the analysis application 104 accesses a malware families data store 106 via a network 105. A plurality of analysts may access and/or control the application 104 via analyst workstations 108 that are communicatively coupled to the network 105. The network 105 may comprise one or more private networks, one or more public networks, or a combination thereof. The analysis application 104 may also access a tradecraft history data store 107 via the network 105.

A piece of suspected malware 111 may threaten an information technology asset 114 in an enterprise information technology system 112. The IT asset 114 may be a firewall, a domain name system (DNS) server, a router, a web server, an application server, a content server, a memory storage device, a data based, a data store, a desktop computer, a laptop computer, or an embedded system computer (a computer system embedded within a hardware system such as a heating, ventilation, and air conditioning (HVAC) blower, an assembly line robot, a gasoline pump). The application server may execute any of one or more applications. The application server may provide an electronic commerce transaction functionality (e.g., receiving on-line purchase orders, brokering payment, commanding fulfillment of the order, etc.). The application server may execute enterprise applications of various kinds. The data store or data base may store confidential human resources records of an enterprise, confidential competitive business information such as marketing data, confidential tax records of the US Internal Revenue Service, confidential financial records such as bank accounts, confidential health and/or medical records, and the like confidential information. The analyst workstation 108 may transmit the suspected malware 111 to the malware analysis application 104 for analysis. In an embodiment, the analyst workstation 108 may access the malware analysis application 104 via a web server 110, for example via a web interface provided to the analyst workstation 108 via the network 105. Alternatively, the analyst workstation 108 may access the malware analysis application 104 via a proprietary interface, for example using an application layer interface between the malware analysis application 104 and the analyst workstation 108.

If the suspected malware 111 is determined to be comparable to one or more malware members of a malware family and/or associated to the malware family as a whole, the application 104 may automatically invoke a malware countermeasures launcher application 120. The launcher 120 may determine an appropriate countermeasure to apply by accessing a malware to countermeasure mapping data store 122 and cause the appropriate countermeasure to execute, for example causing the selected malware countermeasure to be executed on one or more of the IT assets 114 in the enterprise information technology system 112. For example, one or more of countermeasure applications 116 within the enterprise information technology system 112 may be invoked by the malware countermeasures launcher application 120 to execute on one or more of the IT assets 114. Alternatively or in addition, the launcher 120 may cause a security analysis or security field agent to take manual action to counter or mitigate the threat posed by the suspected malware 111.

If the IT asset 114 is integrated with the server computer 102 and/or the malware countermeasures launcher 120, a result of the matching analysis may be sent to the subject IT asset 114, and the IT asset 114 may execute a countermeasures rule based on the result. The IT asset 114 that is integrated with server 102 or the launcher 120 may be configured with a definition of rules that associate to the possible matching results. The rules may be sent to the IT asset 114 by the malware analysis application 104 or the malware countermeasures launcher 120 in the form of a document, for example an XML document, an HTML document, a SNORT document, or other document format. The document may be generated by the malware countermeasures launcher 120 based on processing data in the malware to countermeasure mapping data store 122. Additionally, the IT asset 114 may be configured with a rules engine that processes the result based on the definition of rules to execute one or more countermeasures in response to the result.

As examples, rules may command the IT asset 114, responsive to the received result, to block SSH, HTTP, or ICMP packets in either an incoming direction where the source IP address matches an IP identified by the malware analysis application 104 in the suspected malware 111 or an outgoing direction where the destination IP address matches an IP identified by the malware analysis application 104 in the suspected malware 111. Rules may command the IT asset 114, responsive to the received result, to search and delete files with a filename identified by the malware analysis application 114 in the suspected malware 111 (e.g., a filename that is associated with the subject malware family). Rules may command the IT asset 114, responsive to the received result, to block all emails from an email address identified in the suspected malware 111 (e.g., an email address associated with the subject malware family). Rules may command the IT asset 114, responsive to the received result, to change a PERM_MODE configuration parameter of the IT asset 114 to a 0600 RECURSIVE value. As another example, permissions on an application file may be changed from 777 (read, write, execute permissions for owners, users, and groups) to 644 (only owners can read and write, groups and users can only read, and no one can execute). It is understood that different rules may be associated with different IT assets 114 responsive to the same or similar received result, based at least in part on differences among IT assets 114, such as different target processors, different versions of operating systems, different versions of applications, different positions within the enterprise IT system 112, and other reasons.

Countermeasures may comprise a large variety of software or actions. Countermeasures may mitigate or attenuate the severity of a cyberattack. In some cases, a countermeasure may thwart a cyberattack completely. Alternatively, a countermeasure may mitigate or reduce the potential damage of a cyberattack. A countermeasure may comprise quarantining a file in a portion of memory, for example quarantining the malware to a specific portion of memory that the operating system of the IT asset 114 imposes special restrictions upon. A countermeasure may entail executing the suspected malware 111 at a slower speed, for example causing the operating system to schedule execution of the suspected malware 111 less frequently. A countermeasure may slow or impede the suspected malware 111, allowing information technology security analysts to have time to further analyze the suspected malware 111 and determine a further response to or a final disposition of the suspected malware 111. The countermeasure may allow field operatives to track-down a source of the suspected malware 111 and/or a point of origin of an in-progress cyberattack to take-down the cybercriminal or cybercriminals themselves, for example leading law enforcement to apprehend the cybercriminal in the act.

A countermeasure may comprise a patch that is applied to an existing application executing on one or more of the IT assets 114, for example a patch applied to an email application executing on desktop computer. A countermeasure may comprise an application or a script that changes the domain name service (DNS) mapping of one or more domain names by updating one or more DNS servers and flushing a former DNS mapping from one or more DNS cache servers. A countermeasure may comprise an application or a script that sniffs or otherwise analyzes service requests at a specific port number of a computer system and rejects requests that match a known malware service request signature. A specific example of a countermeasure is domain name system (DNS) sinkholing. It is understood that the present disclosure contemplates automatic invocation of any of a very large number of known countermeasures based on association of the suspected malware 111 with a known malware family and/or based on other triggers. Other countermeasures may comprise one or more of blocking communication relative to an internet protocol address embedded in the suspected malware 111 or software artifact, blocking communication relative to a domain name embedded in the software artifact, moving the software artifact to a quarantined area of memory of the information technology asset, and blocking communication from an email address embedded in the software artifact.

In an embodiment, the launcher 120 may look up one or more countermeasures to apply based partly on the malware family to which the suspected malware 111 is deemed associated and partly based on the values of one or more characteristics of the suspected malware 111. For example, in an embodiment, a number of different countermeasures may be applied to mitigate the effects of malware from the same malware family when the malware is targeted to different target processors, when the malware is associated with different countries, when the malware is associated with different languages, and the like. For example, for a first malware associated with a first malware family, a first countermeasure may be applied when the first malware is associated with Korean language embedded in the malware; for a second malware associated with the first malware family, a second countermeasure may be applied when the second malware is associated with English language embedded in the malware; and for a third malware associated with the first malware family, a third countermeasure may be applied when the third malware is associated with Spanish language embedded in the malware.

The enterprise IT system 112 may be one of a plurality of customers of an information technology security services provider. The security services provider may operate and control the server computer 102, the malware families data store 106, the malware to countermeasures mapping data store 122, the analyst work stations 108, and the web server 110. The customers may access the security services via a web page or web based interface that is supported by the web server 110. A plurality of enterprise IT systems 112 may be supported by the same security services provider, for example by accessing the services via separate instances of the web page or web based interface. Alternatively, the server 102, the data stores 106, 107, 122, the analyst workstations 108, and the web server 110 may be part of the enterprise IT system 112, for example an IT security function of the enterprise.

It is appreciated that the suspected malware 111 may not be an actual component of the system 100 but is illustrated in FIG. 1 as an actor or relevant work piece for the system 100 to act upon and/or respond to. The suspected malware 111 is a software artifact, for example a computer program, a binary, a script, or other computer based logic, and as such may be referred to as a software artifact. It is understood that in some cases the suspected malware 111 may turn out to be benign and to have no intention or functionality that deliberately threatens the desired and ordinary functioning of IT assets 114. In other cases, however, the suspected malware 111, upon analysis and/or research, is determined to be malware. The term software artifact may be applied to any of a suspected malware item, to a known malware item, or a known benign (e.g., not malicious, not malware) software item.

The malware families data store 106 stores a variety of information about known malware families and known malware. Some of the information comprises characteristics, properties, or attributes of the malware and malware families. It is understood that a characteristic may be known about one known malware item but not known about another known malware item. Malware characteristics of known malware or malware families may comprise a plurality of a debug string, a file path, a file name, an author name, a file size, a bitmap, one or more rolling hash values, a compiler used to compile the subject malware, file meta information, a header section, a code section, a data segment section, a stack segment section, a heap segment section, disassembly code for binaries, a domain name, an internet protocol address, an email address, a DOS header, a NT header, a function signature, an image, a version identity, a process name, a programming language of the malware, a data directory name, a registry key, an included file, a file executed, a file modified, a content string, a communication protocol, an actor name, a geographic location, a language, whether the malware is multilingual, information technology asset configurations, or cybercrime stage targeted by the malware. It is understood that yet other characteristics, parameters, or attributes of software artifacts and/or malware may be determined and used in analyzing suspected malware. It will be appreciated that knowing the value of some of the characteristics identified above may contribute to understanding the nature of the suspected malware and to identifying a lineage and/or malware family association of the suspected malware.

Software programmers and/or coders sometimes embed debug strings in code to promote debugging the software during development. Sometimes the embedded debug strings are left in the code after it is deployed, for example disabled by conditional phrases that may be suggested by the following pseudocode: "if DEBUG OPERATION MODE then execute debug code, else skip debug code." Debug strings may be idiosyncratic and may contain words or phrases that would not likely be repeated by chance in unrelated code. Thus, presence of a specific debug string in the suspected malware 111 may be a strong confirmation of shared lineage with a known malware that embeds the same specific debug string. Likewise, file path literals and file names may be idiosyncratic and provide evidence of shared lineage of the suspected malware 111. A name of an author of a software artifact, for example a nickname or call sign such as "the destroyer," may provide evidence of shared lineage. This kind of information may be embedded in the binary executable or in metadata included in a file containing the suspected malware 111. Some of the information may be input by an analyst or another when providing the suspected malware 111 to the malware analysis application 104 for processing.

As is known to one skilled in the art, a bitmap may provide a graphical representation on a display screen when rendered during execution of the suspected malware 111 or of known malware. The presence of a known bitmap in the suspected malware 111 may be used to compare with a known malware that likewise comprises the bitmap. As known to those skilled in the art, sometimes software files can be partitioned into header sections, code sections, data segment sections, stack segment sections, and/or heap segment sections. The partitioning of the suspected malware 111 may be used to compare with a known malware that may have like or similar partitioning. The presence of specific domain names, specific IP addresses, specific uniform resource locators (URLs), or specific email addresses may be useful for establishing a shared lineage between the suspected malware 111 and known malware.

Sometimes software invokes functions, such as operating system functions or common application functions (e.g., email functions), and the argument list used to invoke the functions may be different from one software artifact to the next. Like or similar function invocation signatures may be useful for establishing lineage of a suspected malware item. The presence in the suspected malware 111 of an image or its address or its uniform resource locator (URL) may be useful for establishing lineage of the suspected malware 111. The names of processes that may constitute an executing item of suspected malware may be useful for establishing lineage of suspected malware.

Sometimes snippets of language may be present in plaintext (e.g., not code literals mandated by the employed programming language or scripting language itself) in the suspected malware 111, and a language (Korean, Uzbek, Spanish, English, etc.) of the creator of the suspected malware 111 may be identified thereby. Sometimes snippets of two or more languages may be present, which may be referred to as multilingual. Sometimes the snippets of text may be embedded in the code as comments or as user interface descriptions.

A programming language, configurations, and communication protocols relied upon by the suspected malware 111 on their own may not be determinative, but they may be used to corroborate or exclude association to a known malware family. The characteristics associated with the suspected malware 111 may comprise compilation flags, for example an indication that loop unrolling was enabled via an funroll-loops flag was set when the suspected malware 111 was compiled may be of use in establishing association of the suspected malware 111 to a malware family. Configurations of the suspected malware 111 may comprise selections of settings that make the software artifact suitable for use in specific execution environments, for example configured for execution on a specific target processor or specific platform. The names of equipment that is engaged by the suspected malware 111 can be helpful, for example names of printers, data stores, control work stations, and the like. The geographical location where the suspected malware 111 was discovered or deployed from can be helpful. It will be appreciated that the characteristics described above may not provide significant information in isolation, that it may be the combination of many factors that suggest shared lineage with one malware family and contradict shared lineage with another malware family.

A rolling hash may be performed on different portions of the suspected malware 111. A hash is a number that is calculated by processing a series of data elements using a hashing algorithm. The hash is typically a relatively short number, relative to the complete sequence of hashed data elements. The hash determined from hashing the same base data will be the same. Thus, hashing blocks of data or instructions that are copies of each other will result in hashes that will be the same. Typically hashes of data elements that vary even slightly from each other may be completely different and not proximate in value. The rolling hash may be performed on blocks of 1,000 bytes of suspected malware or some other block size. This rolling hash may be compared to like rolling hashes determined on members of a malware family. Rolling hashes using smaller number of bytes, for example about 100 bytes or about 50 bytes, may be performed on the suspected malware 111 and compared to like rolling hashes determined on members of the malware family. The results of these rolling hashes of the known malware may be stored in the malware families data store 106. The determination of the rolling hashes on the suspected malware 111 may be performed by the malware analysis application 104. In an embodiment, the malware analysis application 104 first determines that the suspected malware 111 matches to a threshold degree of matching with a known family of malware before comparing the rolling hashes of the members of the known malware family to the rolling hashes of the suspected malware.

The content in the malware families data store 106 may comprise identities of malware families (e.g., names of the families) and definitions of malware families. The malware families data store 106 comprises values of characteristics, properties, and/or attributes of malware families and members of malware families. In an embodiment, the malware families data store 106 may comprise copies of malware and metadata about the malware. The content in the malware families data store 106 may be accumulated over time and populated into the malware families data store 106 as new content becomes available. Thus, the data in the malware families data store 106 remains refreshed and updated. The malware families data store 106 may store tens of thousands, hundreds of thousands, even millions of separate instances of malware.

Families may be identified by subject matter experts, for example based on the knowledge of those subject matter experts. Some malware may be associated with specific malware families by subject matter experts. The values of characteristics, parameters, and/or attributes associated with a malware family may be defined by subject matter experts and/or defined based on the values of characteristics, parameters, and/or attributes of malware members of the given malware family. In an embodiment, an application or script (not shown) may execute on the server 102 or another computer system that automatically extracts values of characteristics, parameters, and/or attributes of malware members of a given malware family and updates the corresponding values of characteristics, parameters, and/or attributes of the malware family, for example on the instance of a malware first being assigned to be a member of the subject malware family.

In some cases, some malware families may be identified and/or defined through the use of statistical clustering techniques. For example, an analysis of values of characteristics of malware is performed and mathematical techniques are used to define clustering definitions to segregate the malware into a predefined number of malware families, for example 10 malware families or 100 malware families. This clustering analysis may be performed on malware that the subject matter experts are not confident can be justifiably assigned to the malware families they have defined based on their expertise and knowledge.

In some cases, analysis of the suspected malware 111 to associate it to a known malware family may progress in an iterative fashion. For example, a preliminary analysis of the suspected malware 111 may narrow the related malware families to three different malware families but not be able to confidently associate the suspected malware 111 to only one of the malware families based on the information in the malware families data store 106 alone. The malware analysis application 104 may then access information from the tradecraft history data store 107 and use that information to choose between the runners-up malware families to associate to the suspected malware 111. For example, the malware analysis application 104 may search the tradecraft history data store 107 to find entries where the runners-up malware families are involved. These entries may then be analyzed in the context of the values of the characteristics of the suspected malware 111 to converge on one most likely malware family to which to associate the suspected malware 111.

For example, it may be determined that a particular cybercrime group or gang is responsible for launching the suspected malware 111, and it may be known, based on information in the tradecraft history data store 107, that the subject cybercrime gang only uses malware associated with one of the runners-up families of malware. This would support the inference that the suspected malware 111 is associated with this one malware family. In some cases, the analysis of relevant information accessed from the tradecraft history data store 107 (e.g., information selected based on the list of runners-up malware families and additional information such as values of one or more of the characteristics of the suspected malware 111) may involve using values of two or more characteristics of the suspected malware 111 and the list of runners-up malware families to infer the malware family to associate to the suspected malware 111. For example, the language of plaintext in the suspected malware 111, the location where the suspected malware 111 was launched, and the targeted technology (email tool, login sessions, the like) to be exploited can be combined to select the one most likely malware family out of three runners-up malware families.

In an embodiment, the malware analysis application 104 determines a plurality of metrics for the suspected malware 111 for each known malware family, each metric representing a degree of match between a characteristic of the suspected malware and the corresponding characteristic defined for the known malware family. For example, a degree of match between a list of IP addresses embedded in the software artifact and a list of IP addresses embedded in the members of the known malware family may be determined. These metrics may be Boolean in nature (true or false, 1 or 0). Alternatively, they could be represented as a percentage. In an embodiment, a plurality of characteristics may be compared as a group to a corresponding plurality of characteristics of the known family of malware. For example, if three out of five of the function signatures present in the software artifact (i.e., the suspected malware 111) are present in the members of the known family of malware, the metric may be 0.6 or 60%. If two of a language, a programming language, and a geographic location characteristics of the software artifact match the language, the programming language, and the geographic location characteristics of the known family of malware, the metric may be 0.66 of 66%.

The calculation of metrics may be performed for the software artifact for each of the known malware families identified and stored in the malware families data store 106. It is understood that the characteristics of the malware families stored in the data store 106 may be determined in advance and stored. Some of the values determined for characteristics or parameters of malware families may be an average across all the members of the known malware families. At the same time, some of the values determined for characteristics or parameters of malware families may be a sum or collection of values of the subject characteristic of all the members of the known malware families. For example, the IP address characteristic of a known malware family may include all of the IP addresses that appear in any member of the known malware family. Thus, if a first IP address appears only in a first member of a malware family and a second IP address appears only in a second member of the malware family, the IP address characteristic of the malware family may include the first IP address, the second IP address, and any other IP addresses that appear in one or more member of the known malware family. The value of a characteristic of a malware family may be determined as a union of the values of the characteristics for all members of the malware family. The value of a characteristic of a malware family may be determined as an intersection of the values of the characteristics for all members of the malware family.

A comparison among the matching metrics of the suspected malware 111 or software artifact for each malware family is performed by the malware analysis application 104 to determine a malware family to which the suspected malware 111 best matches. If the best match is below a predefined threshold matching value, the suspected malware 111 or software artifact may be deemed to not match any known malware family and/or to not be malware. If the best match is above a predefined threshold matching value, the suspected malware 111 is associated with the subject malware family. This may be referred to as assigning membership in the malware family to the suspected malware 111.

The comparison of the matching metrics of the suspected malware 111 for each malware family may be performed in a variety of ways. In an embodiment, raw matching scores are used, for example summing all characteristic matching values for the suspected malware 111 to determine a matching score representing the degree of shared lineage between the suspected malware 111 and a known malware family, and comparing the sums associated with each known malware family. The suspected malware 111 may be deemed a member of the known malware family that has the highest sum.

In another embodiment, a sum of weighted factors is used to calculate the degree of shared lineage between the suspected malware 111 and the known malware family, and the sum of weighted factors of associated with each of the malware families are compared with each other to determine the best match of the suspected malware 111 to a known malware family (e.g., the sum with the highest value identifies the best matching malware family). The weights may be uniform across all the known malware families (i.e., the same weights may be used for calculating each sum of weighted factors). Alternatively, different weightings may be used for each different known malware family. When different weightings are used, the weights may be determined in such a way as to normalize the sum of weighted factors, for example to limit the maximum sum to a predefined value, whereby to compare matching values among the different known malware families.

The weightings or coefficients may be represented in a set or vector W as $$W = \{\omega_1, \omega_2, \omega_3, \ldots\} \quad \text{Equation 1}$$

The weightings or coefficients W may be universal and used with every malware family. Alternatively, the weightings or coefficients W may be different for each malware family. For example, an optimization or curve fitting algorithm may be used to determine a uniform set of weightings W to be applied across all the malware families by setting the weightings W to best associate the previously assigned members of malware families to their associated malware family. Alternatively, a different set of weightings W may be found for each different malware family based on best fitting the previously assigned members of the known malware family to that family. At an initial state of the malware analysis application 104, a set of malware families and members of malware families may have already been determined by prior manual efforts, for example based on analysis by subject matter experts. In an embodiment, when the weightings W differ across malware families, all the weightings may be constrained so that the sum of the weightings for any malware family sums to the same constant value, for example sum to 1 or to some other constant.

The match scores may be represented in a set or vector M as $$M = \{\mu_1, \mu_2, \mu_3, \ldots\} \quad \text{Equation 2}$$

where each match score reflects a value in the range from 0 to 1. Each match score represents the degree of match between the value of a characteristic of the suspected malware 111 and the value of the corresponding characteristic of the malware family. These match scores may be considered to be percentages, for example by multiplying the match score (which has a value in the range from 0 to 1) by 100 to obtain percentages in the range from 0% to 100%. A weighted set of match scores may be represented in a set or vector $M_w$ as the set of products of match scores and associated weights or coefficients as:

$$M_w = \{\omega_1\mu_1, \omega_2\mu_2, \omega_3\mu_3, \ldots\} \quad \text{Equation 3}$$

The overall matching score of the characteristics of a software artifact compared to the characteristics of a known malware family may be determined as:

$$\text{family overall match} = \sum_{i=1}^{k} \omega_i \mu_i \quad \text{Equation 4}$$

where k represents the number of characteristics determined for both the known malware family and the suspected malware 111 (e.g., the author of the software artifact may be known but the author for the malware family may not be known, hence author would not be counted in the k number of characteristics determined for both), $\omega_i$ represents the i-th weighting factor or weighting coefficient, and $\mu_i$ represents the i-th match score (amount of match between the value of the i-th characteristic of the software artifact and the value of the corresponding characteristic of the known software family). This family overall match or family match score can be seen as the sum of each of the scalar values of the vector $M_w$, as per Equation 3.

In some cases, the number of characteristics that have values for both the suspected malware 111 and a given known malware family may be different from family to family. To accommodate this eventuality, the family overall score may be calculated to normalize the scores across different malware families, for example as:

$$\text{family overall match} = \frac{1}{k}\sum_{i=1}^{k} \omega_i \mu_i \quad \text{Equation 4.1}$$

Alternatively, the special case of different number of characteristics for different malware families may be taken into account by normalizing the weightings W, for example constraining the weightings W for any malware family to sum to the same constant value such as 1 or another constant.

The software artifact or suspected malware 111 may be assigned membership in a known malware family for which the family overall match for the suspected malware 111 is maximum and when that family overall match is at or above a pre-defined threshold. It is understood that the suspected malware 111 may not in fact be malware after all. If the maximum family overall match is not high enough, the suspected malware 111 may not be classified as malware.

In an embodiment, the vectors M and $M_w$ may each be translated to a representation as a magnitude and a "direction," for example where the direction of the vector is represented as a unit vector (e.g., a vector of amplitude 1 that maintains the relative proportions among the elements of the vector). As such, the amplitude or magnitude of vector M may be found as:

$$|M| = \sqrt{\sum_{i=1}^{k}(\mu_i)^2} \quad \text{Equation 5}$$

the direction or unit vector of vector M may be found as $$\theta_M = \frac{M}{|M|} \quad \text{Equation 6}$$

and then $$M = |M|\theta_M \quad \text{Equation 7}$$

As such, likewise, the amplitude or magnitude of vector $M_w$ may be found as:

$$|M_w| = \sqrt{\sum_{i=1}^{k}(\omega_i\mu_i)^2} \quad \text{Equation 8}$$

the direction or unit vector of vector $M_w$ may be found as $$\theta_{M_W} = \frac{M_W}{|M_W|} \quad \text{Equation 9}$$

and then $$M_w = |M_w|\theta_{M_w} \quad \text{Equation 10}$$

In an embodiment, a baseline percentage match may be calculated as $$MFB = \frac{P}{T} \quad \text{Equation 11}$$

Where P is the number of characteristics of parameters of the software artifact or suspected malware 111 that reached a predefined threshold of matching to the corresponding characteristics or parameters of the subject malware family and where T is the number of characteristics or parameters that are compared between the software artifact and the subject malware family. The predefined threshold for matching in determining P may defined on a characteristic by characteristic basis. Thus, for a first characteristic, the match may be defined to be agreement between the value of the first characteristic associated with the suspected malware 111 and the value of the first characteristic for the malware family within ±0.1 (e.g., when characteristic values range from 0.0 to 1.0) or alternatively within ±10%, while for a second characteristic, the match may be defined to be agreement between the value of the second characteristic associated with the suspected malware 111 and the value of the second characteristic for the malware family within ±0.2 or ±20%.

In an embodiment, a matching factor MF may be defined as $$MF=\{|M|, \theta_m, |M_W|, \theta_{M_W}, MFB\}$$   Equation 11

The MF and the W associated with a software artifact or the suspected malware 111 and a specific known malware family may be used by the malware analysis application 104 to compare the degree of relation between the software artifact or suspected malware 111 and the several known malware families.

Figure 2:
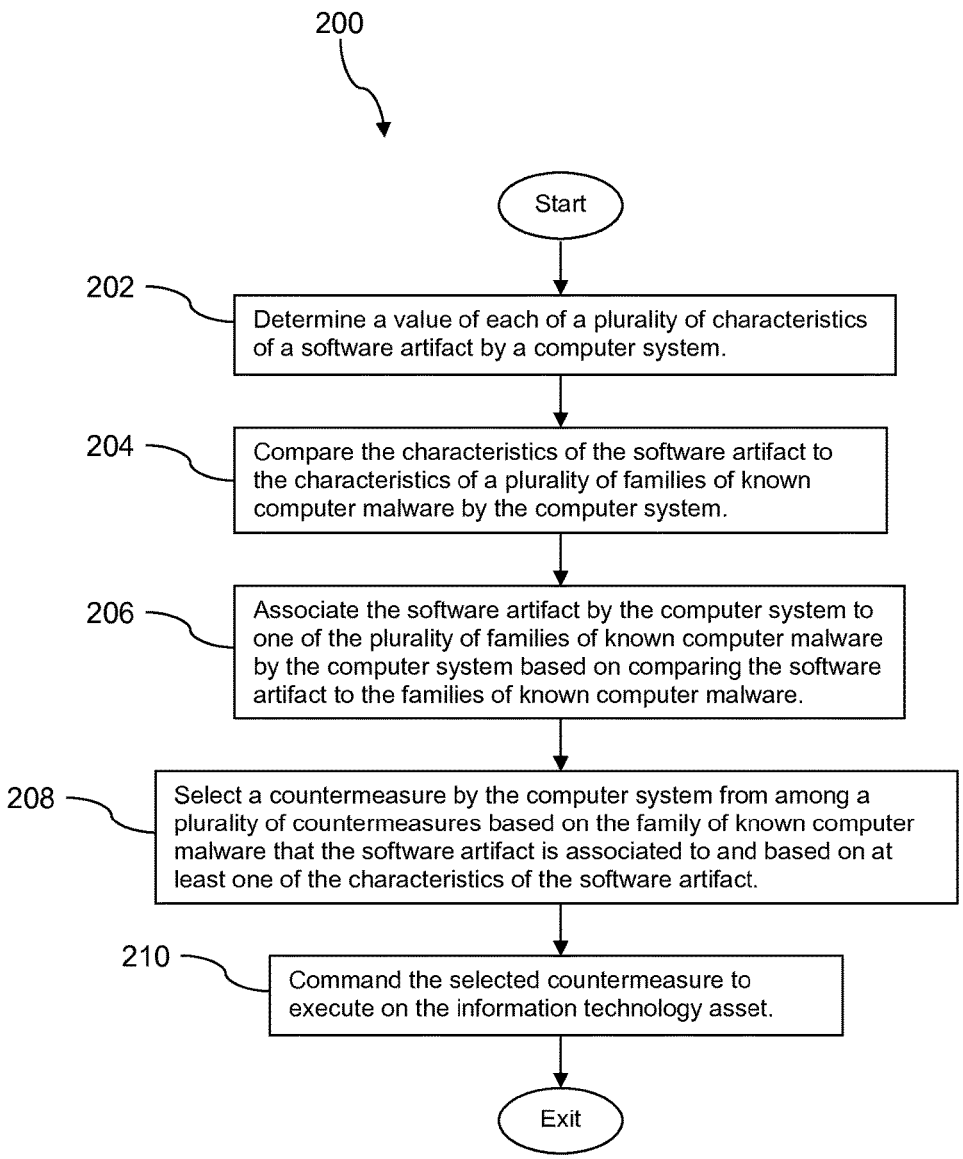
FIG. 2 is a flow chart of a method according to an embodiment of the disclosure.

Turning now to FIG. 2, a method 200 is described. At block 202, determine a value of each of a plurality of characteristics of a software artifact by a computer system. The software artifact may be the suspected malware 111 described above with reference to FIG. 1. It is understood that different software artifacts may allow determining different characteristics, parameters, or attributes. Said in another way, some of the characteristics that can be evaluated and determined for a first software artifact may not be present or able to be determined for a second software artifact. Likewise, some characteristics that can be evaluated and determined for the second software artifact may not be present or able to be determined for the first software artifact. For example, it may be possible to determine a compiler used to compile the first software artifact, while the compiler used to compile the second software artifact cannot be determined. It may be possible to determine an author of the second software artifact, while the author of the first software artifact cannot be determined. Thus, block 202 comprises determining the values of characteristics of the software artifact that are accessible and/or determinable and not determining the values of other characteristics of the software artifact that are, for one reason or another, undeterminable based on the available information.

At block 204, compare the characteristics of the software artifact to the characteristics of a plurality of families of known computer malware by the computer system. The comparison of characteristics is based on comparing the values of the characteristics of the software artifact to the values of the corresponding characteristics of the known malware families. The values of the characteristics of the known malware families (e.g., the families of known computer malware) may be determined as described above with reference to FIG. 1. In some cases, the value of a characteristic, parameter, or attribute of a malware family may be a value that is based on an average of the value of the characteristic across multiple members of the malware family, based on an intersection of the set of values of the characteristic of members of the malware family, or based on a union of the set of values of the characteristic of members of the malware family.

In an embodiment, the result of the comparisons may be captured in metrics. Additionally, summary metrics may be determined by summing metrics associated with individual characteristics of the software artifact or suspected malware 111 as described above with reference to FIG. 1.

At block 206, associate the software artifact by the computer system to one of the plurality of families of known computer malware by the computer system based on comparing the software artifact to the families of known computer malware. The decision to associate the software artifact or suspected malware 111 to a specific known malware family may be performed as described with reference to FIG. 1 above. For example, the decision may be based on comparing the metrics determined in block 204 or comparing summary metrics. In some cases, it may be determined that the software artifact is not in fact an item of malware, and in this case the software artifact is not associated to any malware family. As described further above, the association of the software artifact to one malware family may involve identifying a plurality of preferred malware family candidates (e.g., runner-up families of malware) and selecting among the plurality of candidates based on analysis of related information accessed from the tradecraft history data store 107.

In an embodiment, as part of the processing of block 206, the software artifact further may be assigned to the malware family and the values of the characteristics or parameters of the software artifact may be combined or integrated with those of the malware family as a whole. Additionally, the binary or source code of the software artifact may be stored with other like binary or source of other members of the malware family in the malware families data store 106. It is understood, however, that the software artifact may be associated to the malware family but may not be made a member of the malware family and may not have the value of its characteristics stored in the malware families data store 106. It may be that the action of assigning the software artifact to the malware family and storing or integrating the value of its characteristics with those of the malware family is performed at a later time by an information security technology analyst, for example after more thorough scrutiny and analysis, to be sure of the decision.

At block 208, select a countermeasure by the computer system from among a plurality of countermeasures based on the family of known computer malware that the software artifact is associated to and based on at least one of the characteristics of the software artifact. At block 210, command the selected countermeasure to execute on the information technology asset. For example, invoke a command that causes the countermeasure to execute on one of the IT assets 114. Alternatively or in addition, field security personnel may be commanded to take actions to mitigate or thwart the threat posed by the software artifact. For example, the field security personnel may arrange a sting operation in collaboration with out-of-country police forces to apprehend and take down a ring of cyber criminals who are offering to sell the software artifact or using the software artifact to perpetrate cybercrime. It is understood that countermeasures may be applied at different phases of a cybercrime lifecycle or electronic crime business process: during a credential collection phase, during a monetization phase, or during a laundering phase. For further details about the electronic crime business process, see U.S. Pat. No. 8,813,050 titled "Electronic Crime Detection and Tracking" by John P. Waters et al., which is incorporated herein by reference in its entirety.

Figure 3:
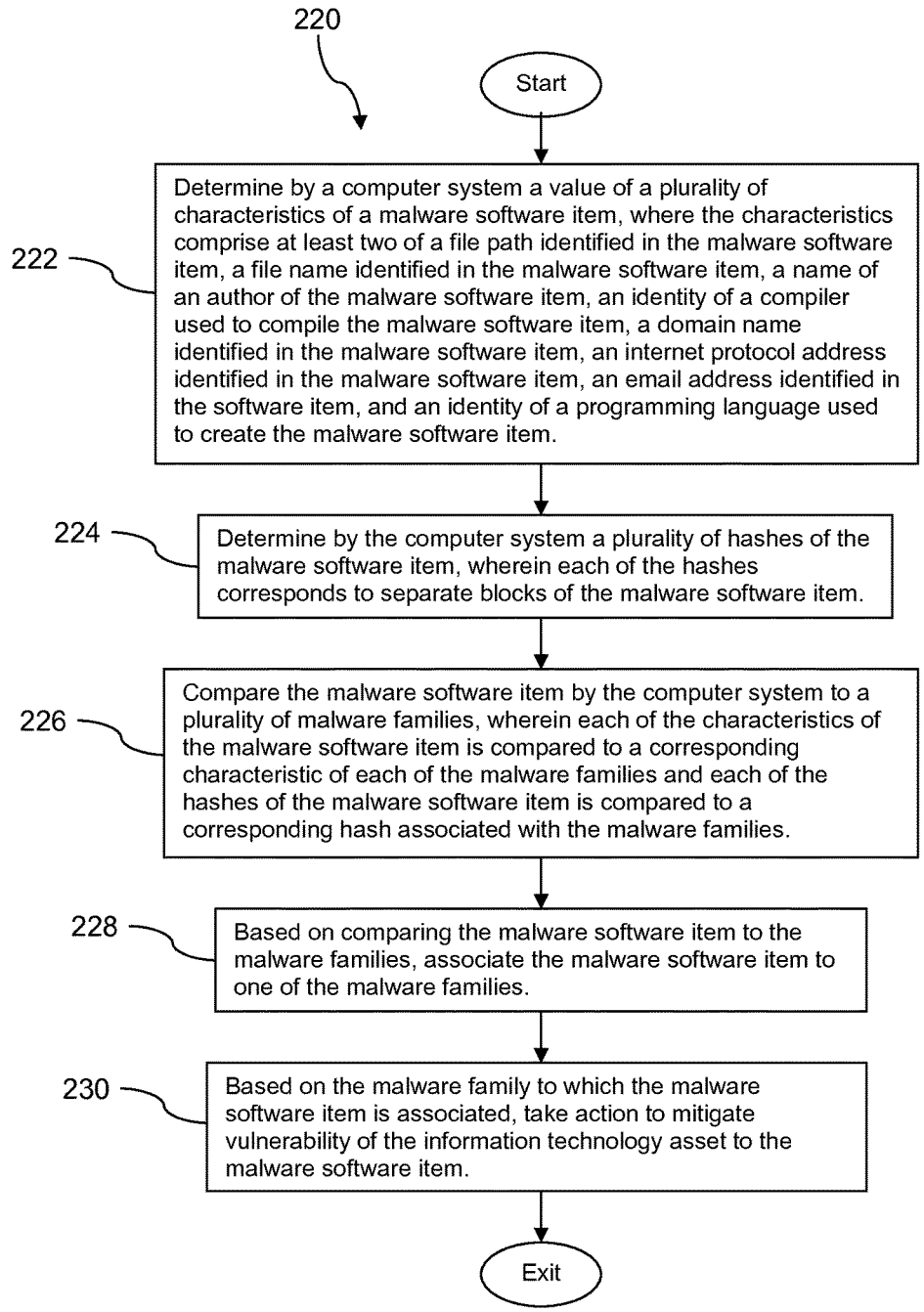
FIG. 3 is a flow chart of another method according to an embodiment of the disclosure.

Turning now to FIG. 3, a method 220 is described. At block 222, determine by a computer system a value of a plurality of characteristics of a malware software item (e.g., the suspected malware 111 which may also be referred to as a software artifact or a software item), where the characteristics comprise at least two of a file path identified in the malware software item, a file name identified in the malware software item, a name of an author of the malware software item, an identity of a compiler used to compile the malware software item, a domain name identified in the malware software item, an internet protocol address identified in the malware software item, an email address identified in the malware software item, and an identity of a programming language used to create the malware software item.

At block 224, determine by the computer system a plurality of hashes of the malware software item, wherein each of the hashes corresponds to separate blocks of the malware software item. As described above, a hash is a number that results from processing a sequence of data (e.g., the bytes of the malware software item, which may be referred to generically as data even if the data encodes instructions, logic, or information) with a hashing algorithm or hash function.

At block 226, compare the malware software item by the computer system to a plurality of malware families, wherein each of the characteristics of the malware software item is compared to a corresponding characteristic of each of the malware families and one or more of the hashes of the malware software item is compared to a corresponding hash associated with the malware families. At block 228, based on comparing the malware software item to the malware families, associate the malware software item to one of the malware families. At block 230, based on the malware family to which the malware software item is associated, take action to mitigate vulnerability of the information technology asset to the malware software item.

Figure 4:
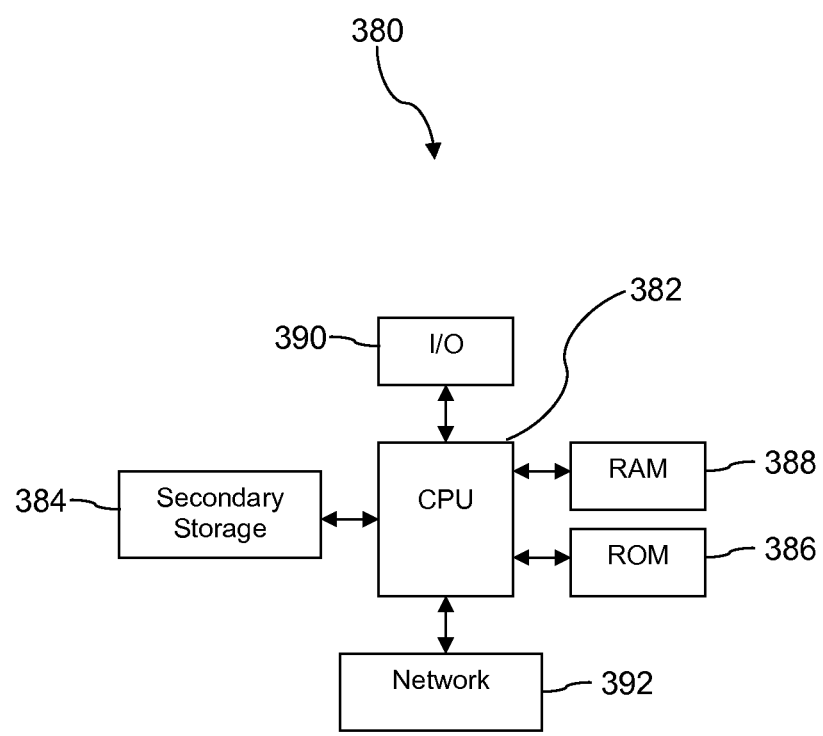
FIG. 4 is a block diagram of a computer system according to an embodiment of the disclosure.

FIG. 4 illustrates a computer system 380 suitable for implementing one or more embodiments disclosed herein. For example, one or more of the server 102, the web server 110, the analyst work stations 108, and the IT assets 114 may be implemented as a computer system consistent with system 380. In an embodiment, one or more of the countermeasure applications 116 execute on a computer system consistent with system 380.

The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of mitigating risk of a cyberattack on an information technology asset, comprising:
   determining, by a computer system, a value of a plurality of characteristics of a malware software item, where the characteristics comprise at least two of a file path associated with the malware software item, a file name associated with the malware software item, a name of an author associated with the malware software item, an identity of a compiler used to compile the malware software item, a domain name associated with the malware software item, an internet protocol address associated with the malware software item, an email address associated with the software item, and an identity of a programming language used to create the malware software item;
   determining, by the computer system, at least one hash of the malware software item;
   comparing the malware software item, by the computer system, to a plurality of malware families, wherein the comparing comprises at least one of comparing each of the characteristics of the malware software item to a corresponding characteristic of each of the malware families and comparing the at least one hash of the malware software item to each corresponding hash associated with each of the malware families;
   based on comparing the malware software item to the malware families, associating the malware software item to one of the malware families;
   selecting, by the computer system, a countermeasure based on the malware family to which the malware software item is associated; and
   causing the countermeasure to execute to mitigate vulnerability of the information technology asset to the malware software item.

2. The method of claim 1, wherein causing the countermeasure to execute to mitigate vulnerability of the information technology asset comprises moving the malware software item to a quarantine area of memory of the information technology asset.

3. The method of claim 1, wherein causing the countermeasure to execute to mitigate vulnerability of the information technology asset comprises reducing the frequency of execution of the malware software item.

4. The method of claim 1, wherein causing the countermeasure to execute to mitigate vulnerability of the information technology asset comprises blocking receiving data packets received from a source internet protocol address that is identified as a characteristic of the malware family to which the malware software is associated.

5. The method of claim 1, wherein causing the countermeasure to execute to mitigate vulnerability of the information technology asset comprises blocking transmission of data packets to a destination internet protocol address that is identified as a characteristic of the malware family to which the malware software is associated.

6. The method of claim 1, wherein causing the countermeasure to execute to mitigate vulnerability of the information technology asset comprises blocking reception of emails from an email address that is identified as a characteristic of the malware family to which the malware software is associated.

7. The method of claim 1, wherein the information technology asset is one of an application server, a web server, a database, a data store, a domain name system (DNS) server, a router, or a content server.

8. The method of claim 1, wherein the computer system determines a plurality of hashes of the malware item, and wherein each of the plurality of hashes corresponds to separate blocks of the malware software item.

9. The method of claim 1, wherein the comparing comprises comparing each of the characteristics of the malware software item to a corresponding characteristic of each of the malware families and comparing the at least one hash of the malware software item to each corresponding hash associated with each of the malware families.

10. A system to identify and counter computer malware, comprising:
    a processor;
    a memory;
    a first data store comprising information about known computer malware, wherein the information about each known computer malware is associated with a malware family of a plurality of malware families, and comprising a plurality of mappings, wherein each mapping associates at least one malware family with at least one countermeasure for mitigating a risk to an information technology asset posed by the known computer malware associated with the at least one malware family;
    a second data store comprising historical information about at least one of known malware attacks, cybercrimes, espionage, hack attacks, hacktivism; and
    an application stored in the memory that, when executed by the processor
       analyzes a software artifact identified to be present in an information technology asset,
       based on the analysis of the software artifact determines a plurality of characteristics of the software artifact,
       determines a plurality of metrics, each metric representing a degree of match between the software artifact and one of the plurality of malware families based on the characteristics of the software artifact and on the characteristics of each of the plurality of malware families stored in the first data store,
       based on the plurality of metrics and based on historical information, determines a malware family that best matches the software artifact,
       responsive to the metric associated with the best match malware family exceeding a pre-defined threshold, determines the software artifact to be computer malware,
       responsive to determining the software artifact to be computer malware, selects at least one countermeasure based on the malware family that best matches the software artifact, and
       causes the at least one countermeasure to be activated on the information technology asset.

11. The system of claim 10, wherein the characteristics of the software artifact comprise at least one of an internet protocol address associated with the software artifact, a domain name associated with the software artifact, a uniform resource locator associated with the software artifact, malware creation information, data directory name, a registry key, an identity of a communication protocol, a function signature, a header section, a code section, a data segment section, a stack segment section, a heap segment section, a disassembly code for binaries, a language used in plaintext embedded in the software artifact, a content string, a geographic location where the software artifact was found, and information technology asset configurations.

12. The system of claim 10, wherein the countermeasure is one of blocking communication relative to an internet protocol address embedded in the software artifact, blocking communication relative to a domain name embedded in the software artifact, moving the software artifact to a quarantined area of memory of the information technology asset, and blocking communication from an email address embedded in the software artifact.

13. A method of mitigating vulnerability of an information technology asset to a computer malware, comprising:
   determining, by a computer system, a value associated with each of a plurality of characteristics of a software artifact;
   comparing, by the computer system, the characteristics of the software artifact to the characteristics of a plurality of families of known computer malware;
   associating the software artifact, by the computer system, to one of the plurality of families of known computer malware based on comparing the software artifact to the families of known computer malware;
   selecting a countermeasure, by the computer system, from among a plurality of countermeasures based on the family of known computer malware that the software artifact is associated to and based on at least one of the characteristics of the software artifact; and
   commanding the selected countermeasure to execute on the information technology asset.

14. The method of claim 13, wherein comparing the characteristics of the software artifact to the characteristics of the families of known computer malware comprises:
   determining a plurality of matching scores for each family of known computer malware, wherein each of the plurality of matching scores of a family of known computer malware is a metric representing the similarity between the value of a characteristic of the software artifact and the value of a corresponding characteristic of the family of known computer malware; and
   determining a sum of the plurality of matching scores for each family of known computer malware.

15. The method of claim 14, wherein weights are applied to each of the plurality of matching scores for each family to produce a plurality of weighted matching scores for each family, wherein the sum of the plurality of matching scores for each family is a sum of the plurality of weighted matching scores for each family of known computer malware, and wherein the weights represent a relative importance among the different characteristics.

16. The method of claim 15, wherein the weights are different for each of the families of known computer malware.

17. The method of claim 15, wherein the weights are uniform for all of the families of known computer malware.

18. The method of claim 15, wherein the weights are determined by a curve fitting algorithm based on scores of a plurality of malware members of each family of known computer malware.

19. The method of claim 15, further comprising:
   comparing, by the computer system, a plurality of characteristics of a second software artifact to the characteristics of the plurality of families of known computer malware; and
   associating the second software artifact, by the computer system, to the one of the plurality of families of known computer malware based on comparing the second software artifact to the families of known computer malware, wherein the countermeasure is selected based on the family of known computer malware that the second software artifact is associated to and based on at least one of the characteristics of the second software artifact.

20. The method of claim 15, further comprising detecting the software artifact in the information technology asset prior to determining the value of each of the plurality of characteristics of the software artifact.

21. The method of claim 15, further comprising determining, by the computer system, a plurality of metrics, each metric representing a degree of match between the software artifact and one of the plurality of malware families based on the characteristics of the software artifact and on the characteristics of each of the plurality of malware families, wherein the software artifact is associated to the one of the plurality of families of known computer malware based on the plurality of metrics.

22. The method of claim 15, wherein the software artifact is associated to the one of the plurality of families of known computer malware in response to the metric associated with the one of the plurality of families exceeding a predefined matching threshold.

23. The method of claim 15, wherein commanding the selected countermeasure to execute comprises moving the software artifact to a quarantine area of memory of the information technology asset.

24. The method of claim 15, wherein the selected countermeasure comprises blocking receiving data packets received from a source internet protocol address that is identified as a characteristic of the malware family to which the software artifact is associated.

25. The method of claim 15, wherein the selected countermeasure blocking transmission of data packets to a destination internet protocol address that is identified as a characteristic of the malware family to which the software artifact is associated.

26. The method of claim 15, wherein commanding the selected countermeasure to execute comprises blocking communication relative to a domain name embedded in the software artifact.

27. The method of claim 15, wherein commanding the selected countermeasure to execute comprises blocking communication from an email address embedded in the software artifact.

28. The method of claim 15, wherein the commanding causes the selected countermeasure to execute automatically without intervention of an information technology security analyst.

29. The method of claim 15, wherein the commanding comprises commanding a security agent to take manual action.

30. A method of mitigating vulnerability of an information technology asset to a computer malware, comprising:
   comparing, by a computer system, a plurality of characteristics of one or more software artifacts to the characteristics of a plurality of families of known computer malware;
   associating the one or more software artifacts, by the computer system, to one of the plurality of families of known computer malware based on comparing the one or more software artifacts to the families of known computer malware;
   selecting one or more countermeasures, by the computer system, from among a plurality of countermeasures based on the family of known computer malware that the one or more software artifacts are associated to; and commanding the selected one or more countermeasures to execute on the information technology asset.

31. The method of claim 30, wherein the commanding causes the selected countermeasure to execute automatically without intervention of an information technology security analyst.

32. The method of claim 30, further comprising determining, by the computer system, a plurality of metrics, each metric representing a degree of match between the software artifact and one of the plurality of malware families based on the characteristics of the software artifact and on the characteristics of each of the plurality of malware families, wherein the software artifact is associated to the one of the plurality of families of known computer malware based on the plurality of metrics.

33. The method of claim 32, wherein the software artifact is associated to the one of the plurality of families of known computer malware in response to the metric associated with the one of the plurality of families exceeding a predefined matching threshold.

34. The method of claim 30, wherein the selected one or more countermeasures comprises at least one of: moving at least one of the one or more software artifacts to a quarantine area of memory of the information technology asset, blocking receiving data packets received from a source internet protocol address that is identified as a characteristic of the malware family to which the one or more software artifacts are associated, blocking transmission of data packets to a destination internet protocol address that is identified as a characteristic of the malware family to which the one or more software artifacts are associated, blocking communication relative to a domain name embedded in at least one of the one or more software artifacts, and blocking communication from an email address embedded in at least one of the one or more software artifacts.

* * * * *